Dec. 22, 1964    E. K. KENNEDY ETAL    3,162,074
MULTIPLE ADJUSTABLE TOOL HOLDER
Filed Sept. 29, 1961    2 Sheets-Sheet 1

INVENTORS
Edwin K. Kennedy
William F. Schofield

BY
Spencer, Rockwell & Bartholow
ATTORNEYS

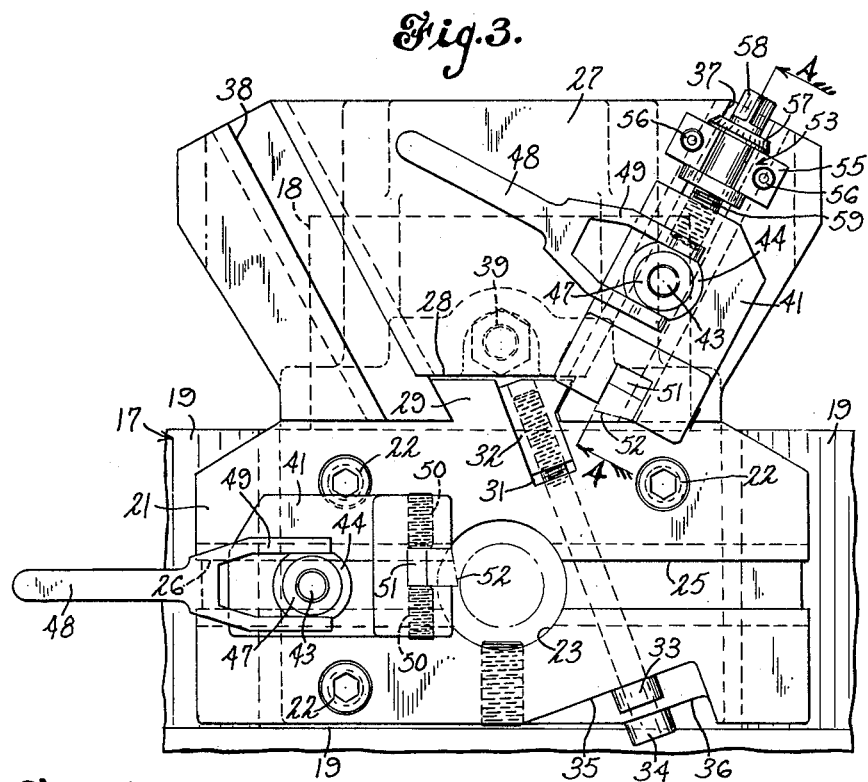
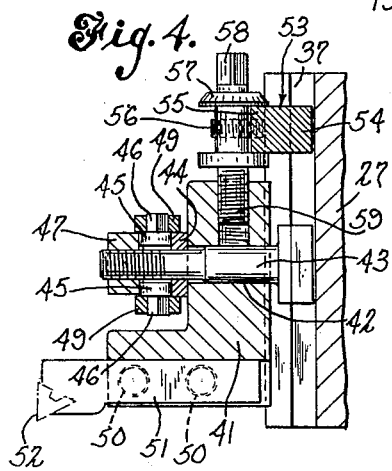
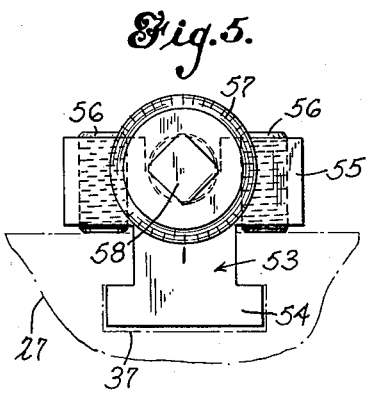

United States Patent Office 3,162,074
Patented Dec. 22, 1964

3,162,074
MULTIPLE ADJUSTABLE TOOL HOLDER
Edwin K. Kennedy, Villa Park, Ill., and William F. Schofield, West Hartford, Conn., assignors to Pratt & Whitney Company, Incorporated, West Hartford, Conn.
Filed Sept. 29, 1961, Ser. No. 141,759
13 Claims. (Cl. 82—24)

This invention relates generally to a multiple tool holder providing for independent adjustment of a plurality of tools. More particularly, the invention relates to a multiple tool holder adapted to be mounted to one face of a multi-faced turret on a turret lathe or similar machine where a workpiece is rotated with relation to one or more cutting tools and the workpiece and tools are fed towards each other. More specifically, the invention relates to a mechanism for holding a plurality of tools and insuring that they are always positioned along a radial line perpendicular to the axis of rotation of the workpiece.

In cutting operations of the type where a workpiece is rotated and a cutting tool is held against the workpiece to remove metal therefrom, it is well known that the tool must be positioned along a radial line perpendicular to the axis of rotation of the workpiece in order that effective cutting is obtained with optimum finish, minimal deflection of the workpiece and without chatter. Single and multiple cutting tool holders are also well known but some fail to provide means whereby every cutting tool is at all times maintained along the aforementioned radial line. In many cases, each tool had to be individually positioned along the radial line by moving the tool in two directions, such as in and up towards the workpiece. In other cases, each of the plurality of tools could not be adjusted towards or away from the workpiece independently of the other tools.

Accordingly, it is an object of this invention to provide a tool holder for a plurality of tools which maintains each tool along a radial line perpendicular to the axis of rotation of a workpiece as the tools are independently adjusted towards or away from the workpiece.

Another object of the invention is to provide a tool holder for a plurality of tools whereby each tool may be adjusted on the radial line towards or away from the workpiece any desired amount.

A further object of the invention is to provide a tool holder for a plurality of tools each of which may be positioned along radial lines independently of the position of the other tools.

Still other objects and advantages of the invention will in part be obvious and will in part be apparent from the specification.

Generally speaking, in accordance with this invention, a mounting block is adapted to be attached to one face of a turret such as a hexagonal turret on a turret lathe. The mounting block is provided with grooves extending along radii which are perpendicular to and meet at the projected axis of rotation of the turret lathe spindle. In each of the grooves there may be slidably mounted a tool fixture which may be locked in any position along a groove and which is adapted to secure a cutting tool therein. Slidably mounted to the top of the first mounting block is a second mounting block which is adapted to slide with relation to the first mounting block along the line parallel to the axis of rotation of the lathe spindle and may be secured in any position. Grooves are also provided in the second block and these grooves extend along radial lines also perpendicular to the projected axis of rotation of the turret spindle. As in the case of the lower block, tool fixtures may be slidably mounted in each of the grooves and are adapted to be independently secured at any position therealong.

The invention accordingly comprises the features of construction, combinations of elements, and arrangements of parts which will be exemplified in the construction hereinafter set forth, and the scope of the invention will be indicated in the claims.

For a fuller understanding of the invention, reference is had to the following description taken in connection with the accompanying drawings in which:

FIG. 3 is a front elevational view of a multiple adjustable tool holder constructed in accordance with this invention;

FIG. 4 is a sectional view taken along line 4—4 of FIG. 3 showing the tool-positioning mechanism; and FIG. 5 is an elevational view showing the tool position micrometer adjusting mechanism.

Figure 1:
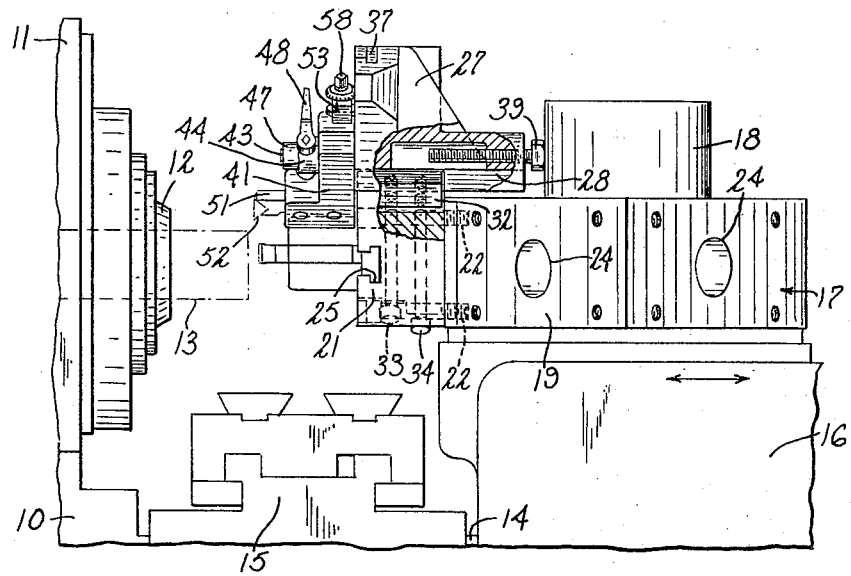
FIG. 1 is an elevational view of a turret lathe showing certain parts thereof and their relation one to another with the multiple tool holder, partially shown in section, mounted to the turret.
Figure 2:
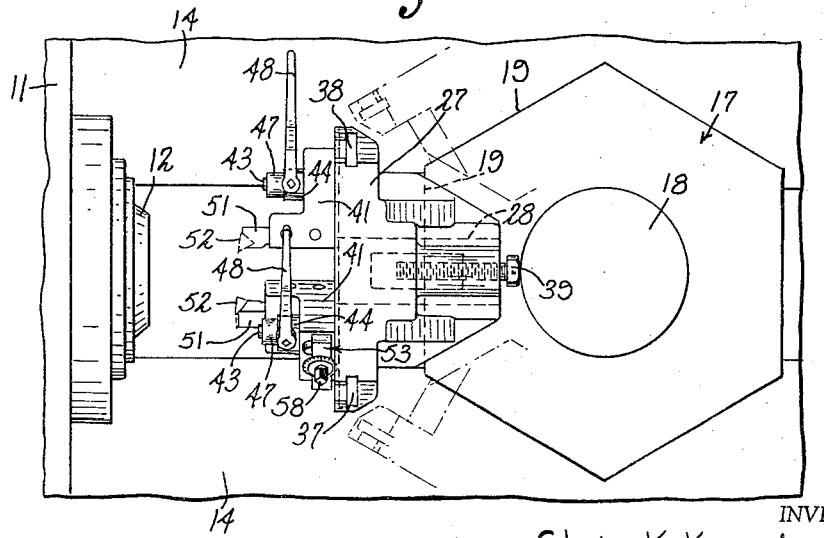
FIG. 2 is a top plan view of FIG. 1.

Referring now to FIGS. 1 and 2, mounted on a turret lathe bed 10 is a head stock 11 having a rotary spindle 12 mounted therein and adapted to clamp and rotate a workpiece 13. Extending along the bed 10 are ways 14 which have positioned thereon a carriage and cross-slide 15. Also slidably mounted on the ways 14 is a saddle 16 having a turret 17 mounted thereon in the usual manner. For the purposes of illustration, a hexagonal turret is shown having a turret-lubricating box 18 mounted on the top thereof. The hexagonal turret 17 has six faces 19 thereby providing six stations for the mounting of various cutting tools and tool holders required to perform any desired cutting operation, such as turning, boring, facing, chamfering, trepanning and the like.

Referring now to FIGS. 1 and 3, the multiple tool holder is provided with a lower base 21 which is bolted to turret face 19 by bolts 22. Lower base 21 has a hole 23 therethrough which is concentric with the hole 24 in each of the turret faces and is adapted to receive a boring bar, chuck or the like. The centers of holes 23 and 24 are in line with the projected axis of rotation of spindle 12 when a face of the turret is rotated to the operative position. T-slots 25 and 26 are provided in the face of the lower base 21 and have the center lines thereof along the diagonal of hole 23 perpendicular to the axis of rotation of spindle 12. The slots 25 and 26 are positioned on opposite sides of the hole 23 and are parallel to ways 14.

Referring now to FIGS. 2 and 3, an upper base 27 is slidably mounted on lower base 21 so as to slide therealong on a line parallel to the axis of rotation of the spindle towards or away from the head stock 11 as desired. Upper base 27 is provided with a dove-tail groove 28 extending the width of upper base 27 from the face thereof to the face of the turret. Lower base 21 is provided with a projection 29 extending the width of the lower base and having a contour mating with approximately one half of dove-tail groove 28 as shown in FIG. 3. A groove 31 is provided in lower base 21 adjacent and co-extensive with projection 29. A floating segment 32 is positioned in groove 31 having the lower end thereof shaped to slide in the groove. The upper end of floating segment 32 forms the remainder of the dove-tail projection so that the upper end of floating segment 32 combined with projection 29 mate with dove-tail groove 28.

Referring again to FIGS. 1 and 3, two bolts 33 and 34 are slidably positioned in lower base 21 and threadedly engage floating segment 32. The heads of bolts 33 and 34 bear on shoulders 35 and 36 respectively of lower base 21 causing floating segment 32 to be drawn deeper within groove 31 when the bolts are tightened. The tightening of the bolts causes the combined width of the dove-tail projection to be expanded and bear against the sides of dove-tail groove 28, thereby locking upper base 27 with relation to lower base 21.

Upper base 27 is also provided with a pair of T-slots 37 and 38 which have their center lines extend through the center of hole 23. As shown in FIG. 1, a bolt 39 is threaded in upper base 27 at the rear end thereof, the bolt being positioned to engage turret-lubricating box 18, thereby providing an adjustable stop for the position of upper base 27.

A total of four T-slots are illustrated by way of example. It is to be understood that more or less may be provided as required. Each of the T-slots may accommodate a tool fixture which may be positioned towards or away from the axis of rotation. For simplicity of illustration, two tool fixtures are illustrated, one of the quick-clamping type positionable by hand and one of the quick-clamping type positioned by micrometer adjustment. The quick-clamping micrometer adjustment tool fixture is shown riding in T-slot 37 in upper base 27 (FIG. 3) and is more clearly shown in FIG. 4. The quick-clamping portion is provided with a body 41 which lies on upper base 27 and has a hole 42 therein. A T-bolt 43 has its head slidably positioned in T-slot 37 with the shank extending through hole 42. A collar 44 is positioned over the shank of T-bolt 43 and rests on body 41. The collar is provided with a pair of cut-outs for receiving two cams 45 having square shanks 46 extending therefrom. An adjustment nut 47 is threaded onto the end of T-bolt 43 and bears on the cams 45. A handle 48 terminates in a bifurcated segment 49 which has square holes in the legs thereof to accommodate the square shanks 46. A tool holder 51 having a cutting tool 52 mounted therein is held fast to body 41 by set screws 50.

The micrometer adjustment comprises a body 53 (FIG. 5) having a small T-shaped end 54 positioned in T-slot 37 and a larger T-shaped head 55 riding on upper base 27. A pair of set screws 56 are threaded in T-shaped head 55. When the set screws are loosened, body 53 may slide in T-slot 37 towards or away from the axis of rotation of spindle 12. Body 53 may be locked in position by the tightening of set screws 56 against body 27. A graduated micrometer head 57 is rotatably mounted in T-shaped head 55 adjacent an index mark thereon parallel to T-slot 37. The graduated end of micrometer head 57 is provided with a wrench shank 58 for rotation thereof. Extending from the other end of micrometer head 57 is a threaded shank 59 which threadedly engages body 41 of the tool fixture. The construction of the quick-clamping type tool fixture which is illustrated positioned in T-slot 26 in lower base 21 is constructed identically to the tool fixture having the micrometer adjustment excepting that the micrometer adjustment mechanism is not included.

In operation, one or more turret faces may have a multiple adjustable tool holder mounted thereto. As illustrated, each multiple tool holder may carry up to four cutting tools in addition to a boring bar, chuck or the like. To position the tool fixture riding in the lower base, handle 48 is rotated so as to point to the headstock, thereby rotating cams 45 releasing pressure from collar 44. This permits T-bolt 43 to ride freely in T-slot 26 and the body 41 of the tool fixture may be manually positioned towards or away from workpiece 13 along the radial line. When the desired position is reached, handle 48 is rotated to the down position parallel with the turret face thereby rotating cams 45 to their high point, causing them to increase the distance between adjustable collar 47 and collar 44, thereby drawing T-bolt 43 into position to bear against the T-slot and lock the tool fixture in that position.

To position the tool fixture on the upper base, bolts 33 and 34 are loosened and upper base 27 is positioned towards or away from headstock 11 to give the desired amount of tool overhang. The tightening of bolts 33 and 34 locks the upper base with relation to the lower base. To position the cutting tool along a radial line, the tool fixture and micrometer adjusting mechanism are loosened and manually positioned with relation to the workpiece. Set screws 56 are tightened against upper base 27, thereby locking T-shaped end 54 in T-slot 37. The micrometer head 57 is rotated through wrench shank 58 to accurately position the tool fixture towards or away from the axis of rotation of the spindle by threaded engagement of threaded shank 59 with body 41. When the tool fixture reaches the desired position, handle 48 is rotated to a position parallel to the turret face, thereby locking body 41 in position as heretofore described. Additional cutting tools may be set up in the other T-slots in the same manner. It is clear that as the position of each of the cutting tools is adjusted with relation to the workpiece, the operator need only be concerned with the distance of each cutting tool from the axis of rotation since alignment of the cutting tools on a radial line perpendicular to the axis of rotation is automatically assured by the multiple tool holder.

It will thus be seen that the objects set forth above, among those made apparent from the preceding description are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A tool holder for mounting to the turret of a lathe having a rotating spindle comprising a base mounted on one face of the turret, a plurality of grooves in said base, each of said grooves positioned on a radial line perpendicular to the axis of rotation of the spindle, a tool fixture slidably mounted in at least one of said grooves, adjusting means slidably mounted in said groove with said tool fixture, means for securing said adjusting means in said groove at any selected position, means extending from said adjusting means and cooperating with said tool fixture for adjusting the position of said tool fixture relative to said adjusting means, and means for securing said tool fixture in said groove at any adjusted position therealong.

2. A tool holder for mounting to the turret of a lathe having a rotating spindle comprising a lower base mounted on one face of the turret, an upper base slidably mounted on said lower base, said upper base being slidable along a line parallel to the axis of rotation of the spindle, means for securing said upper base with relation to said lower base, a plurality of tool fixtures slidably mounted on said upper and lower bases, each of said tool fixtures being selectively positionable along radial lines perpendicular to the axis of rotation of the spindle, and means associated with each of said tool fixtures to scure said fixtures at any selected position.

3. A tool holder for mounting to the turret of a lathe having a rotating spindle comprising a lower base mounted on one face of the turret, an upper base slidably mounted on said lower base, said upper base being slidable along a line parallel to the axis of rotation of the spindle, means for securing said upper base with relation to said lower base, a plurality of grooves in said upper and lower bases, each of said grooves positioned on a radial line perpendicular to the axis of rotation of the spindle, a tool fixture slidably mounted in at least one of said grooves and means for securing said tool fixture in said groove at any position therealong.

4. A tool holder for mounting to the turret of a lathe having a rotating spindle comprising a lower base mounted on one face of the turret, an upper base slidably mounted on said lower base, said upper base being slidable along a line parallel to the axis of rotation of the spindle, means for securing said upper base with relation to said lower base, said securing means comprising a dove-tail groove in one of said bases, a partial dove-tail projection on the other of said bases, said partial dove-tail projection slidably engaging and partly filling said dove-tail groove, a slot in said other base adjacent said partial dove-tail projection, a floating dove-tail segment in said slot and slidably engaging said dove-tail groove to fill that part of the dove-tail groove not filled by said partial dove-tail projection, and means to cause said floating dove-tail segment to further enter said slot thereby causing the combined width of the dove-tail projecting segments to be expanded in the dove-tail groove, and a plurality of tool fixtures mounted on said upper and lower bases and selectively positionable along radial lines perpendicular to the axis of rotation of the spindle.

5. The structure defined in claim 4 wherein said dove-tail groove is in said upper base and said partial dove-tail projection and slot adjacent thereto are in said lower base and said means to cause said floating dove-tail segment to further enter said slot comprises at least one bolt slidably positioned in said lower base and having the shoulder thereof bearing on an outside surface of said lower base, said bolt entering said slot adjacent said partial dove-tail projection from the bottom thereof and threadedly engaging said floating dove-tail segment to draw said floating dove-tail segment into said slot as said bolt is rotated.

6. A tool holder for mounting to the turret of a lathe having a rotating spindle comprising a lower base mounted on one face of the turret, an upper base slidably mounted on said lower base, said upper base being slidable along a line parallel to the axis of rotation of the spindle, means for securing said upper base with relation to said lower base, a plurality of T-shaped grooves in said upper and lower bases, each of said grooves positioned on a radial line perpendicular to the axis of rotation of the spindle, a tool fixture slidably mounted on at least one of said bases with a portion of said tool fixture slidably engaging one of said grooves and means for securing said tool fixture with relation to said groove at any position therealong.

7. A tool holder for mounting to the turret of a lathe having a rotating spindle comprising a lower base mounted on one face of the turret, an upper base slidably mounted on said lower base, said upper base being slidable along a line parallel to the axis of rotation of the spindle, means for securing said upper base with relation to said lower base, a plurality of T-shaped grooves in said upper and lower bases, each of said grooves positioned on a radial line perpendicular to the axis of rotation of the spindle, a tool fixture slidably mounted on at least one of said bases, a bolt having the head thereof slidably engaging one of said T-shaped grooves and having the shank thereof passing through and projecting from said tool fixture and quick-clamping means mounted on said projecting shank portion and cooperating with said tool fixture for securing said tool fixture with relation to said groove at any position therealong.

8. A tool holder for mounting to the turret of a lathe having a rotating spindle comprising a lower base mounted on one face of the turret, an upper base slidably mounted on said lower base, said upper base being slidable along a line parallel to the axis of rotation of the spindle, means for securing said upper base with relation to said lower base, a plurality of grooves in said upper and lower bases, each of said grooves positioned on a radial line perpendicular to the axis of rotation of the spindle and tool fixture means adjustably mounted in at least one of said grooves for supporting a cutting tool and selectively moving it towards or away from the axis of rotation.

9. The structure defined in claim 8 wherein each of said grooves has a T-shaped cross section and said tool fixture means comprises a main body positioned on one of said bases over one of said T-shaped grooves, said main body adapted to support a cutting tool, a bolt having the head thereof slidably engaging said T-shaped groove and a shank portion passing through and projecting from said main body, and a quick-acting clamp having a locking handle, said clamp engaging the projecting portion of the shank of said bolt and cooperatively engaging said main body to cause said main body to bear against the base on which it is positioned and to cause the head of said bolt to bear against the T-shaped groove in a direction opposite to the direction of bearing of said main body against said base when said locking handle is moved to a clamping position thereby securing said tool fixture with relation to said groove at any position therealong.

10. The structure defined in claim 9 and further including micrometer adjusting means cooperating with said tool fixture for accurately adjusting the position of said tool fixture along said groove.

11. The structure defined in claim 10 wherein said micrometer adjusting means comprises a micrometer support having a T-shaped foot segment slidably engaging said groove, a T-shaped upper portion extending from said groove and having segments thereof positioned over said base, a graduated micrometer segment rotatably mounted in said micrometer support, said micrometer support having an index mark thereon adjacent the graduations on said graduated micrometer segment, said graduated micrometer segment having a shank portion projecting therefrom and threadedly engaging said tool fixture, means for rotating said graduated micrometer segment for adjusting the distance between said micrometer adjusting means and said tool fixture means, and means for securing said micrometer adjusting means in said groove at any position therealong.

12. The structure defined in claim 11 wherein said means for securing said micrometer adjusting means comprises at least one set screw threadedly engaging the T-shaped upper segment of the micrometer support and bearing against said base when said set screw is tightened thereby causing said T-shaped foot segment to bear against said groove in a direction opposite to the direction of bearing of said set screw.

13. The structure defined in claim 1 whrein each of said grooves has a T-shaped cross-section and said adjusting means and said means extending therefrom comprise a micrometer support having a T-shaped foot segment slidably engaging said groove, a T-shaped upper portion extending from said groove and having segments thereof positioned over said base, a graduated micrometer segment rotatably mounted in said micrometer support, said micrometer support having an index mark thereon adjacent the graduations on said graduated micrometer segment, said graduated micrometer segment having a shank portion projecting therefrom and threadedly engaging said tool fixture, and means for rotating said graduated micrometer segment for adjusting the distance between said adjusting means and said tool fixture.

References Cited in the file of this patent
UNITED STATES PATENTS

| | | |
|---|---|---|
| 571,402 | Schneider | Nov. 17, 1896 |
| 944,876 | Key | Dec. 28, 1909 |
| 1,000,011 | Johnson et al. | Aug. 8, 1911 |
| 1,026,455 | Potter | May 14, 1912 |
| 1,113,023 | Land | Oct. 6, 1914 |
| 2,608,121 | Fellroth | Aug. 26, 1952 |